United States Patent [19]
Marue et al.

[11] Patent Number: 5,615,855
[45] Date of Patent: Apr. 1, 1997

[54] TELESCOPING MAST WITH INTEGRAL PAYLOAD

[75] Inventors: Edward A. Marue, Tuscon, Ariz.; Kenneth J. Pereira, Hanford, Calif.

[73] Assignee: Tri-Ex Tower Corporation, Visalia, Calif.

[21] Appl. No.: 353,118

[22] Filed: Dec. 9, 1994

Related U.S. Application Data

[63] Continuation-in-part of Ser. No. 72,817, filed as PCT/US92/08721 Oct. 6, 1992, which is a continuation-in-part of Ser. No. 772,167, Oct. 7, 1991, Pat. No. 5,163,650.

[30] Foreign Application Priority Data

Mar. 31, 1994 [WO] WIPO ............... PCT/US94/03549

[51] Int. Cl.$^6$ ............................................. F16M 11/00
[52] U.S. Cl. ........................ 248/405; 52/40; 52/117; 52/118; 82/141; 248/188.5; 248/333; 248/406.1; 343/713; 343/883; 343/901
[58] Field of Search ............... 248/405, 454.3, 248/454.4, 651, 406.1, 411, 422, 188.5, 334.1, 333, 335; 343/883, 878, 880, 901, 713; 52/67, 105, 118, 117, 40; 82/141

[56] References Cited

U.S. PATENT DOCUMENTS

| 388,491 | 8/1888 | Hill | 182/232 |
|---|---|---|---|
| 797,464 | 8/1905 | Sjastram | 182/232 |
| 3,688,455 | 9/1972 | Zebuhr | 52/115 |
| 4,062,156 | 12/1977 | Roth | 52/111 |
| 4,254,423 | 3/1981 | Reinhard | 52/118 |
| 4,577,827 | 3/1986 | Eliscu | 248/656 |
| 4,663,900 | 5/1987 | Rehm et al. | 52/118 X |
| 4,871,138 | 10/1989 | Sauter | 248/408 |
| 5,163,650 | 11/1992 | Adams et al. | 248/405 |
| 5,218,375 | 6/1993 | Hillman | 52/118 |

FOREIGN PATENT DOCUMENTS

| 671611 | 10/1963 | Canada | 248/405 |
|---|---|---|---|
| 2555820 | 5/1985 | France | 52/118 |
| 2575780 | 7/1986 | France | 52/118 |
| 1260800 | 2/1968 | Germany | 248/405 |
| 3434517 | 3/1986 | Germany | 52/118 |
| 3611810 | 8/1986 | Germany | 52/118 |
| 3636893 | 7/1987 | Germany | 52/118 |

*Primary Examiner*—Ramon O. Ramirez
*Assistant Examiner*—Michael J. Turgeon
*Attorney, Agent, or Firm*—Drummond & Duckworth

[57] ABSTRACT

In an integrated telescoping mast-payload assembly, the payload forms the top telescoping section.

5 Claims, 5 Drawing Sheets

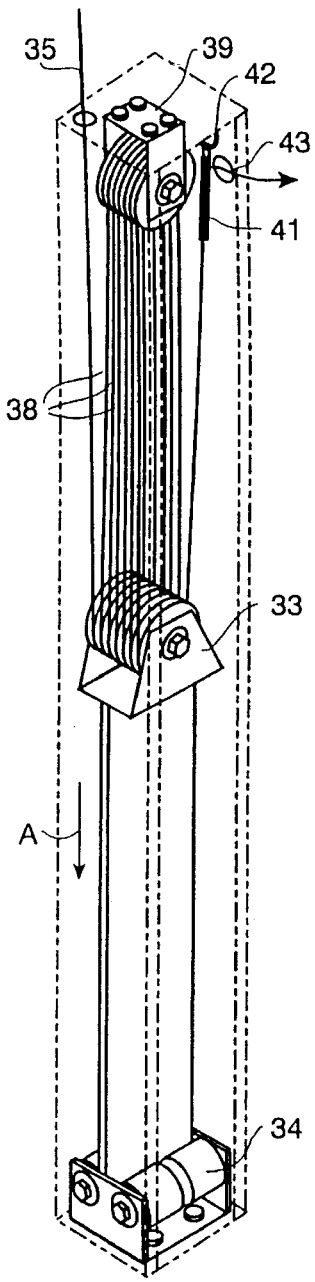
FIG. 3
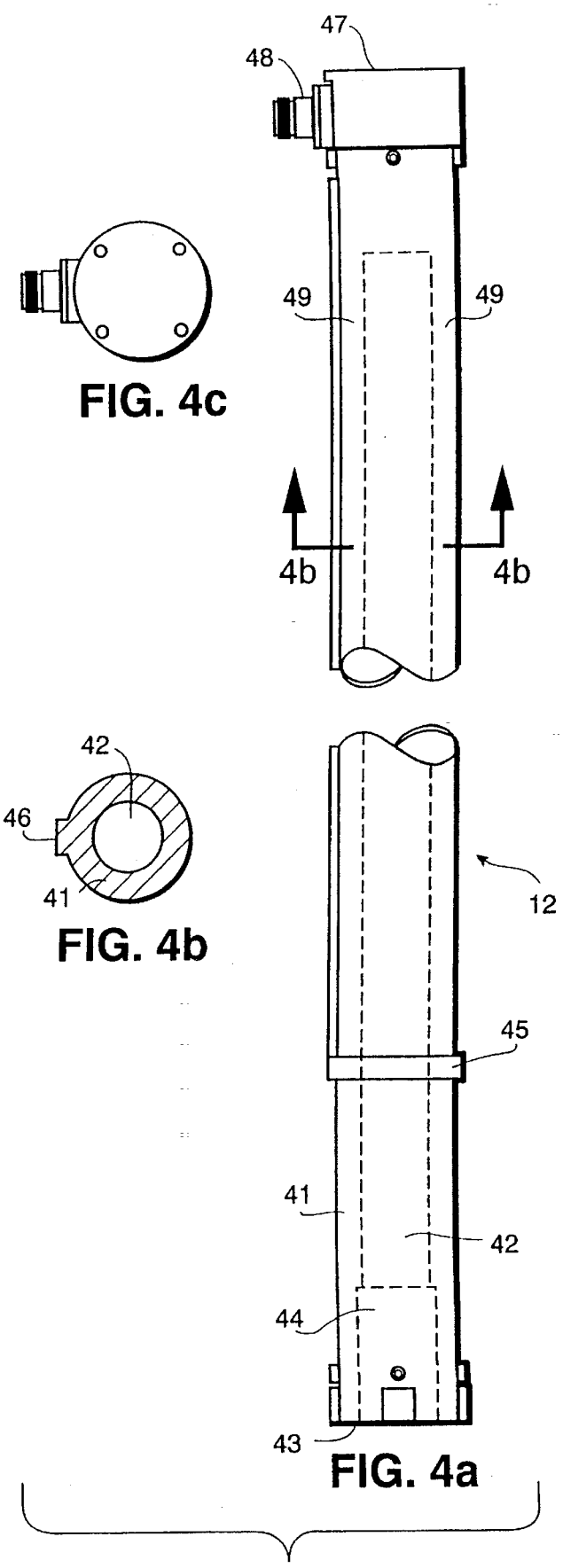
FIG. 4c
FIG. 4b
FIG. 4a

TELESCOPING MAST WITH INTEGRAL PAYLOAD

This application is a Continuation-in-Part of the U.S. application Ser. No. 08/072,817, filed Jun. 7, 1993, a national-stage application derived from PCT international application PCT/US92/08721, filed Oct. 6, 1992, which is, in turn, a Continuation-in-Part of U.S. application Ser. No. 07/772,167, filed Oct. 7, 1991, now U.S. Pat. No. 5,163,650, issued Nov. 17, 1992.

This invention relates to a telescoping mast which includes an integral payload.

More particularly, the invention pertains to an integrated telescoping mast-payload assembly which is specially adapted for mobile and portable use.

In another respect the invention relates to a telescoping mast-payload assembly which is specially configured for use under hazardous ambient conditions, in conjunction with protective shelters for operating personnel.

Telescoping masts have been widely employed for radio antennas, lights and a variety of other fixtures, such as instrumentation and telemetry packages for robotic vehicles, television cameras, mast-mounted antenna rotators, preamplifiers, radiation sensors and similar fragile electronic and electro-mechanical instrument packages.

Under extreme environmental conditions encountered during transport and use of portable telescoping masts which carry such fragile or environmentally sensitive packages, it would be highly desirable to provide improved mechanical, electrical and other forms of protection for the payload when the telescoping mast is retracted. Additionally, since the nested mast height and, in turn, the operational deployed height are often critical operational parameters of a telescoping mast, it would be desirable to provide a telescoping mast-payload assembly which provides minimum nested, (fully retracted) height and in turn, maximum deployed, (fully extended) operational height.

Accordingly, the principal object of the present invention is to provide an improved telescoping mast-payload assembly.

Still another object of the invention is to provide such an assembly which has minimum nested height and maximum deployable height for a given number of telescoping mast sections.

Yet another object of the invention is to provide such an integrated telescoping mast-payload assembly which is specially adapted for mobile or portable use.

A further object of the invention is to provide an integrated mast-payload assembly which protects the payload during storage and transportation while the mast is fully retracted.

A still further object of the invention is to provide an integrated mast-payload assembly which obviates the need to remove and reinstall the payload during transportation and in which there is no need for human interaction with the assembly to install or remove a payload during storage transportation or use.

This and other, further and more specific objects of the invention will be apparent to those skilled in the art from the following detailed description, taken in conjunction with the drawings in which:

FIG. 3 is a perspective cut-away view of the cable stowage-dispensing assembly of the embodiment of FIGS. 1–2;

FIGS. 4a–4c are, respectively, cut-away views of the radiating antenna element of the assembly of FIGS. 1–3, cross-sectional views thereof (along section line 4—4 of FIG. 4a) and the upper end view thereof;

Figure 1:
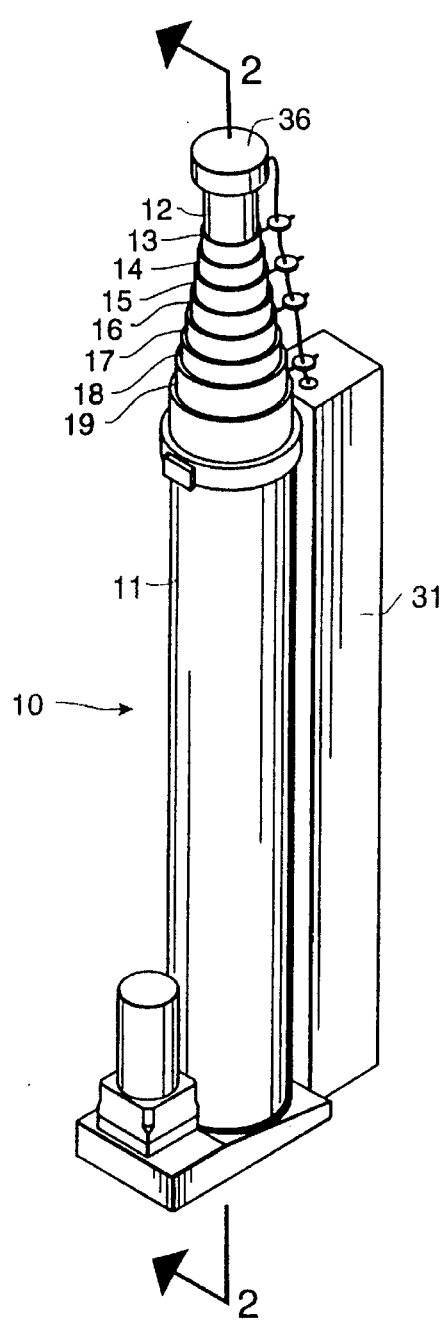
FIG. 1 is a perspective view of an integrated telescoping mast-payload assembly which embodies the present invention.

Briefly, in accordance with the broadest aspects of the invention, I provide an integrated telescoping mast-payload assembly comprising at least two or more nesting, telescoping mast sections, each section having an upper end and a lower end. The telescoping sections include one or more lower sections and a top section which is dimensioned to slidably nest within the next-lower section. Means are provided for extending and retracting the top section relative to the next-lower section and each of the lower sections relative to the section next below (except for the bottom section). A payload forms at least the upper end of the top section and at least a portion of the payload is received within the next-lower section when the top section is fully retracted. The lower section or sections provide protection for the payload when the top section is fully retracted.

According to a preferred embodiment, the assembly is mounted upon or in a vehicle or upon or in a transportable shelter.

In another presently preferred embodiment, the payload is an antenna for transmitting and/or receiving electromagnetic energy such as radio signals.

In yet another preferred embodiment, one or more of the lower sections is radiopaque to shield the payload from stray electro-magnetic radiation, particularly EMP, when the assembly is retracted.

According to the best mode contemplated at present, the integrated mast-payload assembly includes means for mechanical locking the upper and lower sections together when the upper section is fully extended and when it is fully retracted, but preventing relative sequentially movement between the sections when the upper section is between the fully retracted and fully extended positions.

In another preferred embodiment of the invention, when the nature of the payload prevents forming it with a central longitudinal parameter, a plurality of axial drive screws (at least two), are employed and these drive screws are laterally spaced from the longitudinal center line of the telescoping mast sections.

The drawings are provided to further illustrate to those skilled in the art how to make and use the invention and are not intended as a limitation on the scope of the invention. In the drawings, like reference characters identify the same elements in the several views.

Figure 2:
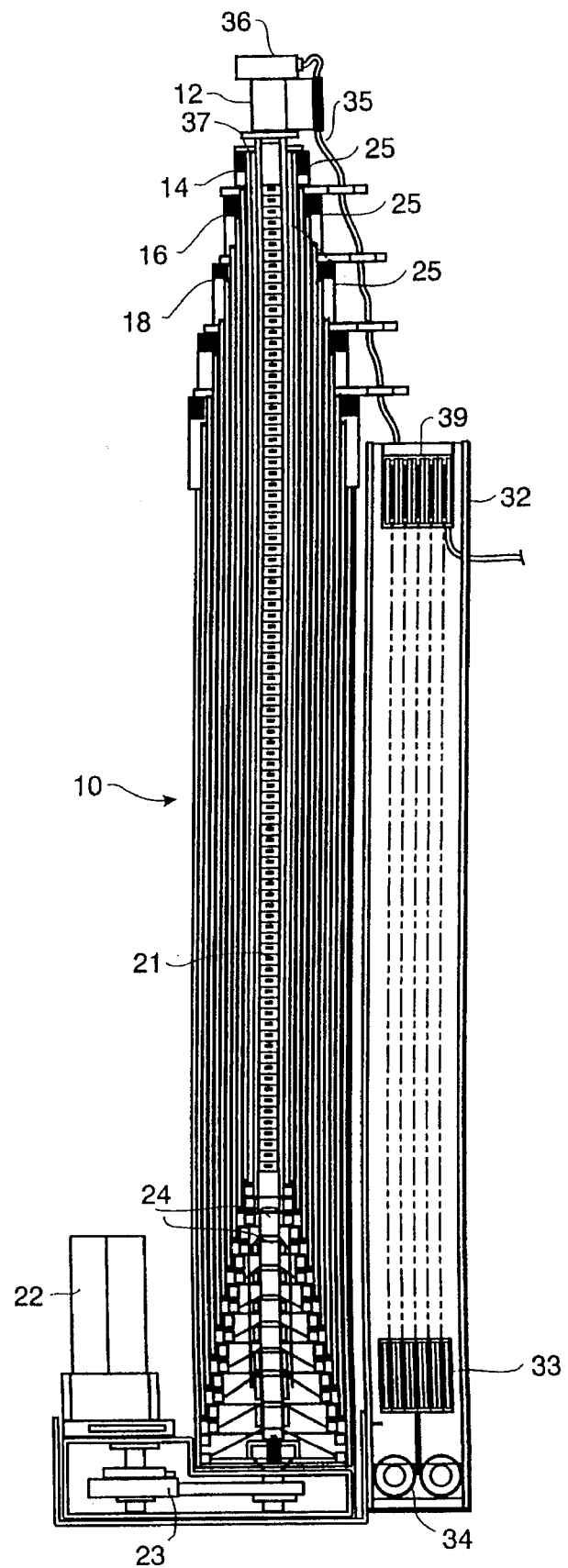
FIG. 2 is a cross-sectional view of the assembly of FIG. 1 taken along section 2—2 thereof.

Referring to FIGS. 1–3, the telescoping mast-payload assembly, generally indicated by reference numeral 10 includes a bottom mast section 11, a top mast section 12 and one or more lower sections 13–19. Each of the mast sections 12–19 is dimensioned to be slidably received within the next-lower section. The top section 12 and each of the one or more lower sections 13–19 can be extended and retracted relative to the next lower section from a fully retracted position, as shown in FIGS. 1–2 to a fully extended position (not shown). A single axial drive screw 21, which is rotated by operation of an electric motor 22 which transmits rotational force through a drive train 23, engages nuts 24 carried internally at the bottom end of each of the mast sections 12–19. Rotation of the axial drive screw 21 causes upward or downward movement of the nuts 24 on the drive screw 21 and corresponding relative motion of the mast section associated with each of the nuts 24. Holddown locking mechanisms 25 are provided to cause sequential deployment and retraction of each of the mast sections 12–19, to lock adjacent sections together when the mast is fully nested and when each section is fully extended relative to its next-lower section. A cable stowage/dispensing sub-assembly 31 includes an elongate frame 32, a moveable multi-sheave pulley 33 and a spring 34 connected to the pulley 33 which urges the pulley 33 downwardly in the direction of the arrow A. The transmission line cable 35 is connected at its upper end to the connector portion 36 of a antenna element 37 which forms the hollow antenna element which forms the upper section of the telescoping assembly 10. The transmission line passes into the frame 32 forming windings 38 on the moveable pulley 33 and stationary pulley 39. A terminal portion 41 of the cable 35 is fixed by means of a hook 42 to the frame 32 and passes through an outlet aperture 43 to its point of connection with another component, e.g., radio transceiver, (not shown). Further details of the operation of the drive components 21–24, the locking devices 25 and the cable stowage/dispensing assembly 32 are disclosed in the published international application No. PCT/US92/08721 (International Publication Number WO 93/07395, published 15 Apr. 1993), which is incorporated herein by reference.

FIGS. 4a–4c depict the top section 12 of the telescoping mast of FIGS. 1–3, the major length thereof being formed as a hollow cylinder 42 having a longitudinal bore 42. At the lower end 43 the diameter of the bore 42 is increased to provide a socket 44 which receives a nut which engages threads on the axial drive screw 21. The annular shoulder 45 cooperates with the locking mechanism on the upper end of mast section 13, in the manner previously described, a key 46 is formed as a longitudinal shoulder on the outer surface of the cylindrical section 41 to prevent rotation of the upper section 12. The upper end 47 of the top section 12 is provided with a coaxial connector 48 for attaching to rf transmission cable 35 with the rf rotated/receiving components which are embedded into side walls 49 of the top section 12.

Figure 5:
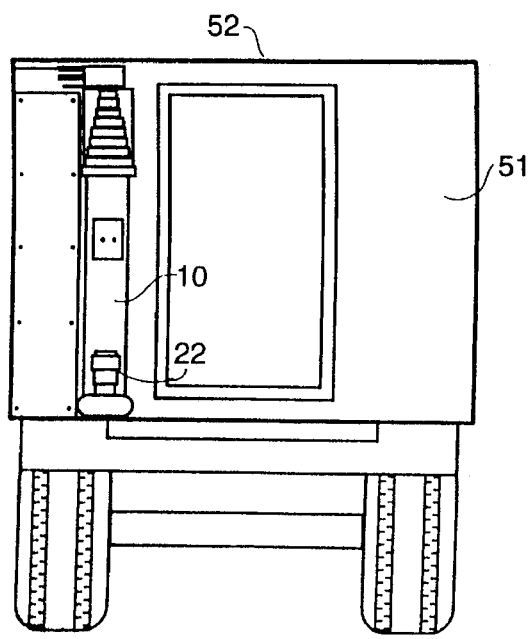
FIG. 5 depicts the assembly of FIGS. 1–4, mounted externally on an operational vehicle, e.g., on the SICPS shelter of an HMMWV/CUCV transporter.
Figure 6:
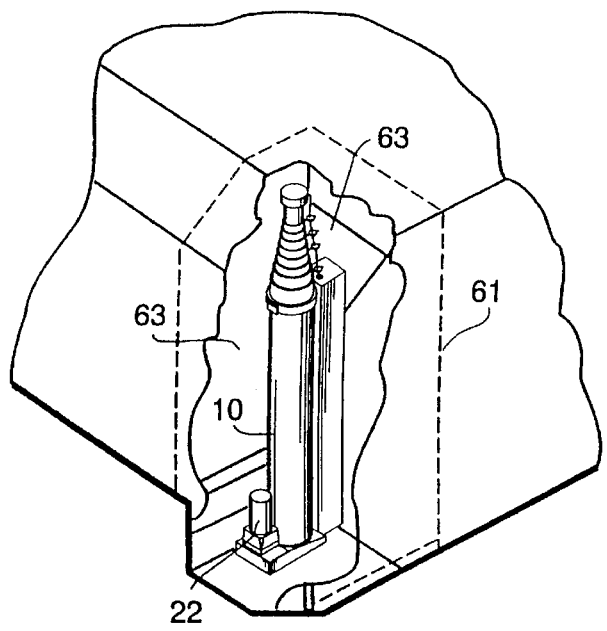
FIG. 6 depicts an alternate mobile installation of the assembly of 1–4, e.g., in the antenna mast cavity of a C2V Bradley vehicle.

FIG. 5 depicts the integrated mast-payload assembly 10 of FIGS. 1–4, mounted externally on the rear wall 51 of an SICPS shelter 52 carried on a suitable vehicle, e.g., the HMMWV/CUCV transporter. Alternatively, as depicted in FIG. 6, the assembly 10 can be mounted within a special radio antenna enclosure, indicated by the dash lines 61 of an enclosed vehicle such as the Bradley C2V. In either case, the electrical power lines, and control cables for the drive mechanism 22 and the coaxial cable 35 are routed through the bulkheads 51 (FIG. 5) or 63 (FIG. 6) to the interior of the vehicle, which protectively houses the human operators, such that the mast and payload can be extended and retracted from within vehicles 52, 62, without requiring personnel to operate outside these shelters.

Another embodiment of the invention is depicted in FIGS. 7–11. This embodiment is useful when the character of the payload does not permit it to be formed as a hollow cylinder (as shown in FIG. 4).

Figure 7:
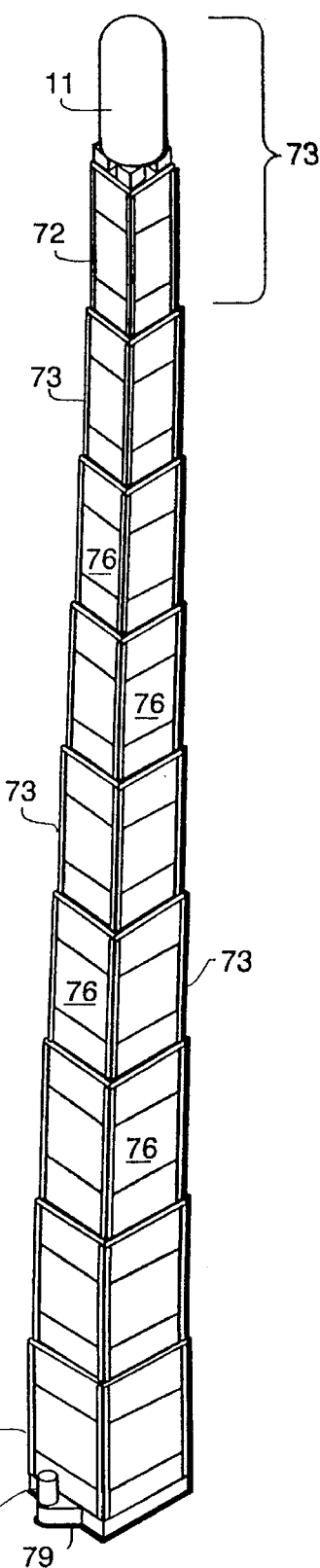
FIG. 7 is a perspective view of another embodiment of the integrated telescoping mast-payload assembly of the present invention, in which the payload package does not have a central axial aperture, in which the mast sections have a polygonal cross-section and which utilizes multiple axial drive screws, and in which a cable assemble is enclosed internally of the mast and protected thereby.
Figure 8:
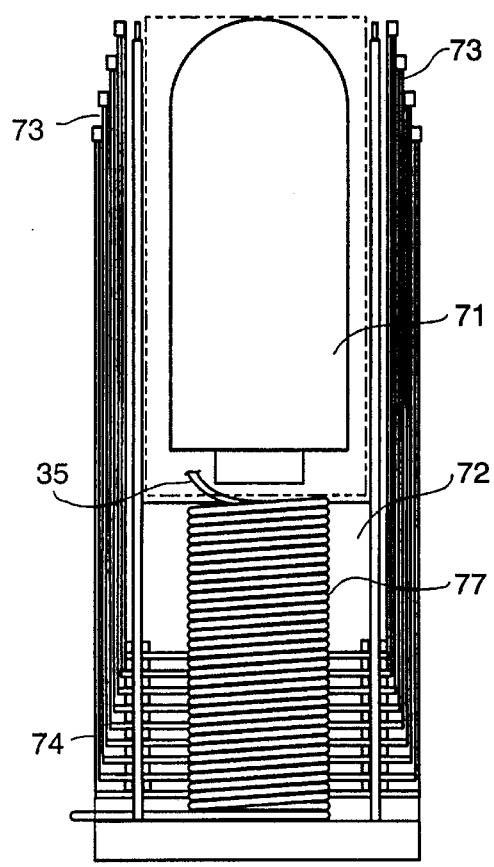
FIG. 8 is a sectional view of the assembly of FIG. 7 in the fully retracted (nested) condition, taken along section line 8—8 of FIG. 9.
Figure 10:
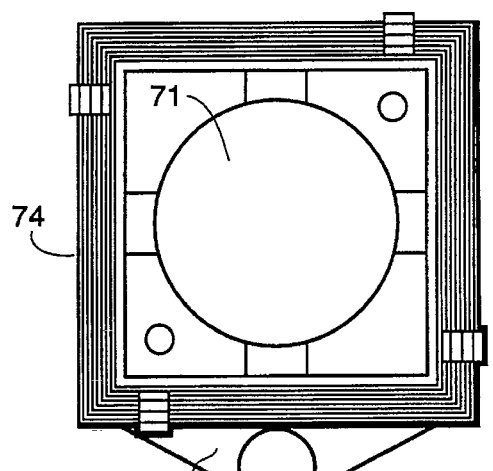
FIG. 10 is a sectional view of the assembly of FIGS. 8–9 taken along section line 10—10 thereof.
Figure 9:
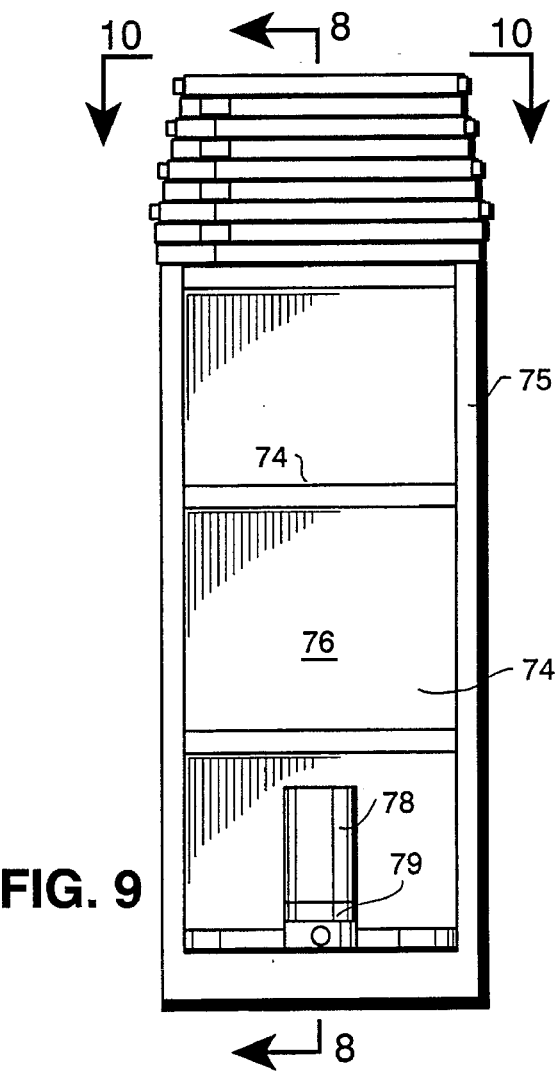
FIG. 9 is a side view of the assembly of FIGS. 7–8, with the mast fully retracted.
Figure 11:
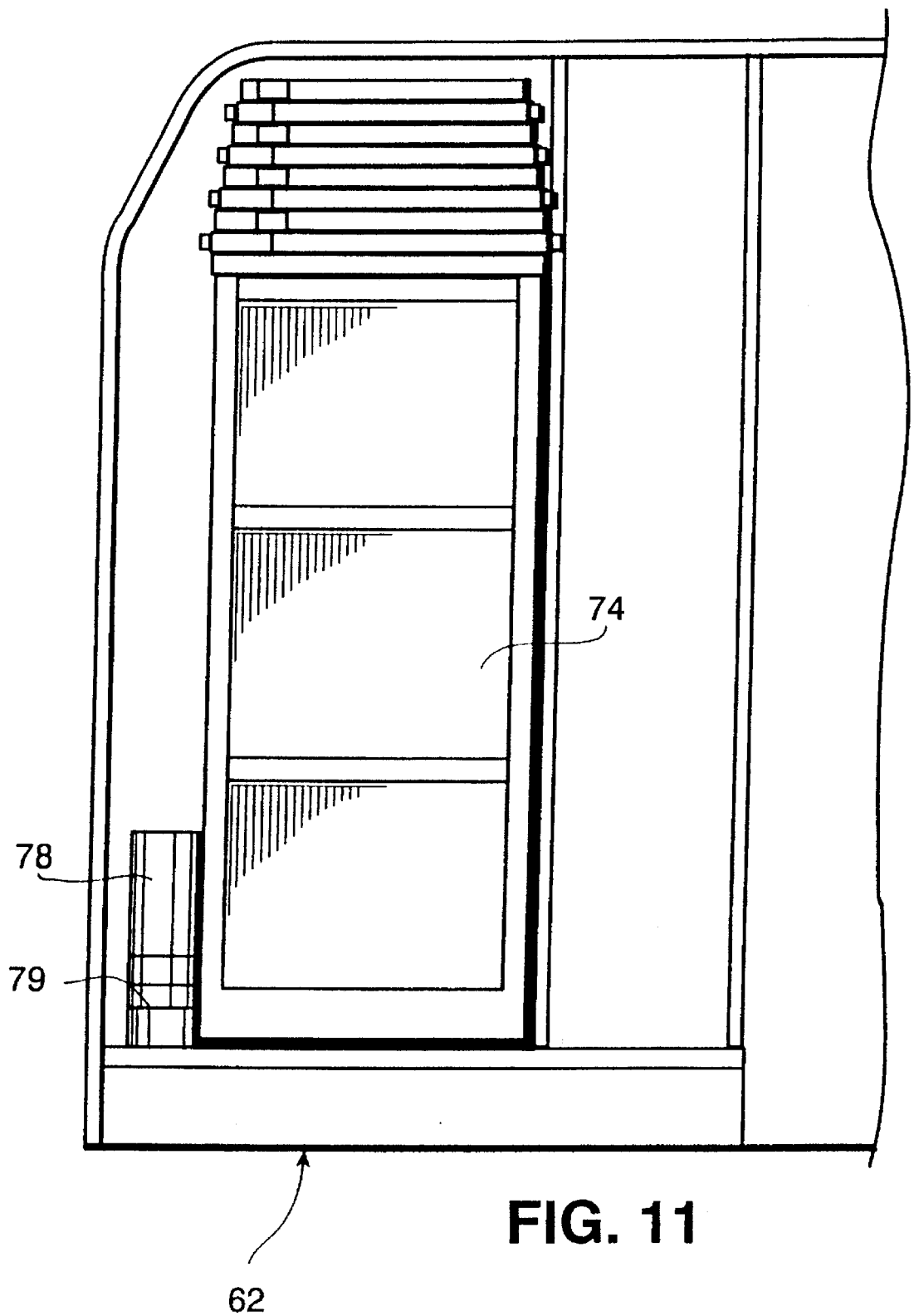
FIG. 11 is a cut-away rear view depicting a mast-payload assembly of FIGS. 7–10, mounted in the antenna mast cavity of a vehicle such as the Bradley C2V.

As shown in FIGS. 7–11, a complex payload such as the J-STARS SCDL antenna 71 is operatively mounted on a base 72. The antenna 71 and base 72 form the upper section 73 of a multi-section telescoping mast comprising a plurality of intermediate lower sections 73 and a bottom section 74, each of the sections 72–74 are formed of aluminum frame members 75, covered and stiffened by graphite composite panels 76. Alternatively, panels 76 can be omitted, thereby reducing the wind load on the mast. The extended assembly of FIG. 7 is shown in cross-section in FIGS. 8 and 10 and in a side view in FIG. 9. In the embodiment of FIG. 7–9, the antenna cable 35 is preformed as an extensible coil 77. Power to extend and retract the assembly is provided by an electric motor 78 and associated drive mechanism 79. As shown in FIG. 11, the assembly of FIGS. 7–10 can also be mounted internally of a radio antenna well 91 formed in an appropriate vehicle such as the C2V Bradley.

Having described the invention in such terms as to enable those skilled in the art to make and use it and having identified the presently known and preferred best modes thereof, I claim:

1. In a telescoping mast assembly, including:
    a plurality of nesting, telescoping mast sections, including a top section and at least one lower section, each of said sections having upper and lower ends, and
    means for extending and retracting each of said sections relative to the next-lower section,
  the improvement comprising:
    a payload, located only in said top section,
      said top section, including said payload, being dimensioned to be received and nest within the next-lower section,
      at least a portion of said payload being received within said next-lower section when said top section is fully retracted,
    such that said next-lower section provides protection for said payload when said top section is fully retracted,
      said payload being a member of the group consisting of radio antennas, lights, instrumentation and telemetry packages for robotic vehicles, television cameras, antenna rotators, preamplifiers, radiation sensors and electronic and electro-mechanical instrument packages.

2. The assembly of claim 1 mounted on a vehicle.

3. The assembly of claim 1, in which said payload is an antenna for electromagnetic energy.

4. The assembly of claim 1, in which said lower section is radiopaque.

5. The assembly of claim 1 which further includes:
  (a) a transmission line cable for transmitting a signal to or from said payload; and
  (b) a sub-assembly for stowing and dispensing said cable when said mast assembly is retracted and extended.

\* \* \* \* \*